Sept. 24, 1963   N. M. REINERS   3,104,594
PISTON CONSTRUCTION
Filed Oct. 31, 1960
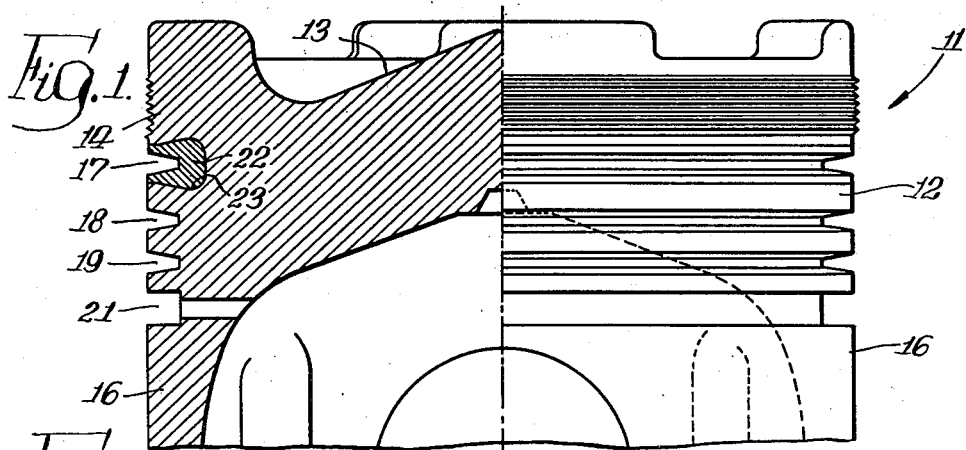
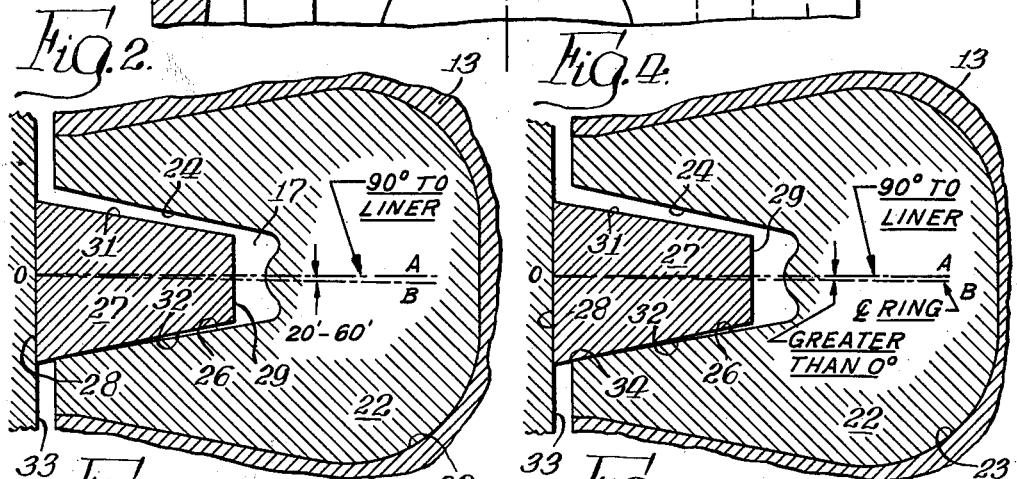
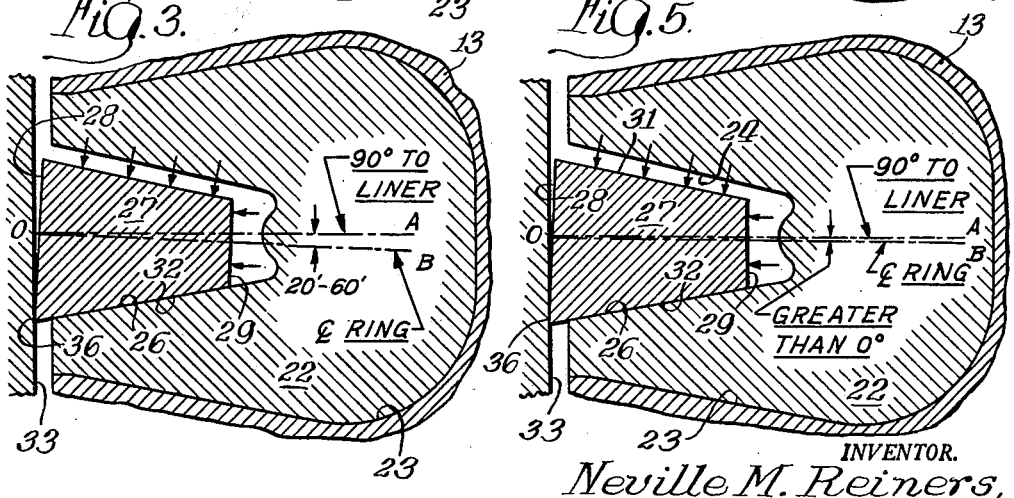
INVENTOR.
Neville M. Reiners,
BY
Davis, Lindsey, Hibben & Noyes
Attys.

ved Sept. 24, 1963

3,104,594
PISTON CONSTRUCTION
Neville M. Reiners, Columbus, Ind., assignor to Cummins Engine Company, Inc., Columbus, Ind., a corporation of Indiana
Filed Oct. 31, 1960, Ser. No. 66,125
3 Claims. (Cl. 92—227)

This invention relates to pistons for internal combustion engines and more particularly to the combination of a piston ring with the piston.

One of the operating conditions which has not heretofore been fully taken into account in the design and construction of a piston is the angular change of the radial center line of the piston ring groove in the piston and the consequent effect on the contact of the face of the ring on the cylinder wall due to temperature variations. Because of the fact that the central portion of the crown of the piston becomes hotter than the peripheral portions of the piston body, a greater expansion occurs at this point, thereby causing the piston ring groove or grooves, and their associated rings, to tilt or become inclined in the direction of the piston expansion as the piston heats up to operating temperatures. This is particularly true of the upper groove and the ring therein, and such ring may thus have only an upper edge contact rather than a full face contact with the cylinder wall thereby causing a loss of compression, improper heat transfer to the cylinder wall and perhaps excessive oil consumption.

The foregoing is in part attributable to the fact that most commercially produced pistons are formed with the radial center lines of their ring grooves perpendicular to the longitudinal axis of the piston when the piston is cold. Thus, when such a piston heats up, expansion and distortion occur and the aforementioned undesirable results are incurred.

The general object of the invention is to provided an improved piston construction in which the operating efficiency of the piston rings thereon are not materially affected by engine temperature changes.

A more particular object is to provide a novel piston construction in which the effects of thermal distortion of the piston on the angular relationship of the piston ring grooves and rings, particularly the upper compression ring, are compensated for when the grooves are formed so that the rings are disposed at an optimum angle for overall piston efficiency in relation to the cylinder wall when the piston is hot.

Other objects and advantages of the invention will become apparent from the following description taken in connection with the accompanying drawing in which:

FIG. 1 is a fragmentary vertical sectional view, partly in elevation, of the upper portion of a piston embodying the features of the present invention;

FIG. 2 is an enlarged fragmentary cross-sectional view of a portion of the piston of FIG. 1 showing the relationship of the upper compression ring thereof to its groove and an adjacent cylinder wall when the piston is cold and not subjected to gas loading, the clearances and angular relationships of the parts being exaggerated for clarity;

FIG. 3 is a view similar to FIG. 2 showing the position of the parts when the piston is cold and subjected to gas loading;

FIG. 4 is a view similar to FIG. 2 and showing the position of the parts when the piston is hot and not subjected to gas loading; and FIG. 5 is a view similar to FIG. 3 showing the position of the parts when the piston is hot and subject to gas loading.

Briefly described, the present invention contemplates an improved temperature compensated piston construction which takes into account and provides for the effects of thermal distortion or localized expansion of the piston on the angular relationship of the piston ring groove adjacent the crown portion of the piston as the piston temperature varies from a cold starting condition to the normal operating temperature condition of the engine. According to the present invention, the compression ring grooves, and particularly the upper compression ring groove, are initially formed in the piston, or a ring insert, in such a manner that the radial center line of the groove is inclined inwardly and downwardly by a small angle when the piston is cold. The angle is such that when the piston heats up, the inclination of the radial center line of the groove is decreased and the center line is substantially perpendicular to the axis of the piston but preferably is still inclined at a very small angle.

The ring used in the groove as above described is of such construction that it has full face contact with the cylinder wall when there is no gas loading of the ring, whether the piston is relatively cold or has become heated, and when the ring is gas loaded as in certain portions of the engine cycle and the piston is in either the cold or heated condition, the ring undergoes a twist which causes its face to contact the cylinder wall only at the lower edge thereof in the fashion of a taper face ring and the lower side of the ring is in full contact with the lower side of the groove to effect a seal therewith, the ring having to undergo a smaller amount of twist when the piston is heated than when cold, so that positive sealing engagement is attained when the piston is heated which is the condition existing during most of the time the engine is in operation.

Thus, in FIG. 1, the upper portion of a piston 11 is illustrated, which embodies the features of the invention, the piston 11 being of the type adapted for use in a diesel engine. The piston 11 comprises a body having a crown or top 13 and a cylindrical side wall 14 part of which is a skirt 16. In the present instance, the piston 11 is shown as including three compression ring grooves 17 to 19, inclusive, and an oil ring groove 21. The piston illustrated is made of aluminum and the upper or top groove 17 is formed in a ring insert 22 of harder metal such as cast iron, the aluminum being cast around the insert. The grooves 17 to 19 are shown as of such form as to receive rings of the keystone type. Thus, each of the compression ring grooves 17 to 19 have their annular upper and lower sides, indicated at 24 and 26 respectively, symmetrically arranged relative to the center line of the groove and inclined inwardly toward each other. The lower side 26 of the groove 17 is thus inclined inwardly and upwardly with respect to a line perpendicular to the axis of the piston 11. Inasmuch as the groove 17 is closest to the crown 13 and thus affected to the greatest extent by distortion due to temperature changes of the piston 11 and bowing of the crown 13, the invention will be described hereinafter only in conjunction with the groove 17.

As will be seen from FIGS. 2 to 5, the ring 27 has a cylinder engaging face 28 and upper and lower sides 31 and 32 symmetrical with respect to the radial center line of the ring and inclined inwardly and toward each other. The inner periphery of the ring, indicated at 29, may be parallel to the face 28.

In the present instance, the sides 31 and 32 of the ring are inclined relative to each other at substantially the same angle as the upper and lower sides 24 and 26 of the groove 17. The ring 27 is of course resilient and expands into engagement with the cylinder wall indicated at 33.

The piston, upon starting of the engine, may be relatively cold. However, during operation, the heat of the combustion gases heats the piston. Such heating is greater in the central portion of the crown than in the peripheral portions of the piston because the peripheral portions can dissipate heat to the cylinder wall 33. Thus, the central portion of the piston will expand axially to a greater extent than will the peripheral portions. Such expansion therefore causes the grooves to twist relative to their initial cold position to an extent sufficient to adversely affect the sealing relation of the ring with the lower side of the groove. This in turn tends to decrease the heat dissipation from the piston through the ring to the cylinder wall.

In a piston embodying the present invention, the groove is initially formed so that, when the piston becomes heated, the groove assumes a position which provides for the desired sealing relation with the ring. Thus, as illustrated in FIG. 2, the center line of the groove 17, indicated by the line OB, as the piston is manufactured, is tilted downwardly and inwardly relative to a line perpendicular to the axis of the piston as indicated by the line OA. The angle of inclination is slightly more than the amount necessary to compensate for the twist resulting from the unequal heating of the portions of the piston. Such angle in this instance is about 20 to 60 minutes. The sides 24 and 26 of the groove 17 are of course symmetrically arranged with respect to the centerline OB of the groove.

With the ring 27 in operative position in the groove 17, FIG. 2, illustrates the position of the ring in relation to the groove and the cylinder wall 33, when the piston is cold and not subjected to any substantial gas loading, such as during the exhaust stroke portion of the engine cycle. Under these conditions, the ring 27 has its face 28 in flush or full face contact with the cylinder wall 33, the lower side 32 of the ring 27 being in contact with the lower side 26 of the groove 17 only at the outer edge, indicated at 34. The ring, under these conditions, has no twist and hence its radial center line coincides with the line OA.

FIG. 3, illustrates the position of the ring 27 in relation to the groove 17 and the cylinder wall 33 when the piston is cold but subjected to gas loading, as during the compression and power strokes of the engine. Due to the pressure forces acting on the upper side 31 of the ring 27, the ring is given a twist and the lower side 32 thereof is forced into flush or full side contact with the lower side 26 of the groove 17. The face of the ring 27 is constantly urged into contact with the cylinder wall 33 by the gas pressure acting on the inner periphery 29 and by its natural resilience. Because the piston 11 is cold, the twist of the ring is sufficient to cause the center line of the ring to coincide with the center line OB of the groove. The face 28 of the ring thus contacts the cylinder wall 33 at its lower edge, indicated at 36, in the manner of a taper face ring. The ring 27 will thus shift between its positions shown in FIGS. 2 and 3 when the engine is cold.

FIGURE 4 illustrates the position and relationship of the ring when the piston is hot and when the ring is not subjected to gas loading. FIGURE 4 is thus exemplary of the position of the ring 27 during the exhaust stroke of the engine. As will be apparent from this figure, distortion of the piston due to heat has occurred and the center line OB of the groove has been displaced upwardly toward the crown portion 13 so that it is almost coincident with the line OA perpendicular to the axis of the piston. The center line of the groove is preferably disposed at a very small angle below the line OA, slightly greater than 0°. Due to the absence of any substantial gas pressure loading, the face 28 of the ring 27 is in flush or full face contact with the cylinder wall 33. The lower face 32 of the ring thus contacts the lower side 27 of the groove at the annular outer edge 34 thereof as in FIG. 2.

FIGURE 5 illustrates the normal or working position and relationship of the ring 27 in relation to its groove 17 and the cylinder wall 33 when the piston has reached normal operating temperatures and the ring is subjected to gas loading. It will be noted that the effect of gas pressure loading acting on the upper side 31 and inner periphery 29 of the ring is the same as in FIG. 3. Thus, the lower face 32 of the ring is forced into flush or full side contact with the lower side 26 of the groove to provide sealing engagement therewith. A good heat dissipation path is thereby established through the ring from piston to the cylinder wall. The face 28 only contacts the wall 33 along its lower edge 36 because of the twist given to the ring. Under this condition, the center of the ring coincides with the center line OB of the groove.

The purpose of disposing the center line OB of the groove so that it is almost coincident with the line OA but at a very small angle below the line OA, when the piston is hot, is to insure having the lower side 32 of the ring in contact throughout its entire area to provide positive sealing engagement and good heat transfer when the ring is gas loaded. If it were attempted to have the center line OB of the groove coincide with the line OA when the piston is hot, manufacturing tolerances might sometimes result in a piston in which the line OB were slightly above the line OA. In such a case, the lower side 32 of the ring would contact the lower side 26 of the groove only at the inner lower corner of the ring and poor sealing engagement and heat transfer would result. By providing the small angle between the center line OB of the groove and the line OA, the gas loading of the piston will at all times result in positive sealing engagement and good heat transfer. Further, the slight angular relationship between the face 28 and wall 33 is advantageous in that good oil control is maintained and there is less tendency toward scoring of the cylinder walls due to the presence of foreign particles.

I claim:

1. The combination of a piston having an annular piston ring groove provided with a lower side inclined inwardly and upwardly with respect to a line perpendicular to the axis of the piston, and a ring in said groove having a lower side inclined inwardly and upwardly with respect to a line perpendicular to the axis of the piston, the angle of inclination of the ring being more than the angle of inclination of the groove when the piston is cold, the inclinations of said lower sides of the groove and the ring being such that, when the piston is hot and subjected to gas loading, the lower side of the ring seats flush on the lower side of the groove with the outer peripheral face of the ring inclined to the wall of said cylinder so that said wall is engaged by said face only along the lower edge thereof.

2. The combination of a piston having an annular piston ring groove provided with groove sides symmetrical with respect to the center line of the groove, said center line being inclined inwardly and downwardly from a line perpendicular to the axis of the piston, when the piston is cold, a ring in said groove having sides symmetrical with respect to the center line of the ring with said ring sides having the same relation to each other as the relation between the groove sides, the outer peripheral face of the ring being perpendicular to the center line of the ring, the inclination of said groove center line being such that, when the piston is hot and subjected to gas loading, the lower side of the ring seats flush on the lower side of the groove with the outer peripheral face of said ring inclined to the wall of said cylinder so that said wall is engaged by said face only along the lower edge thereof.

3. A piston construction adapted for use in a cylinder of an internal combustion engine comprising a piston body having a crown and a skirt portion, a piston ring insert having a piston ring groove therein and carried by said piston body in said crown, said piston ring insert being mounted in said piston body so as to have the center line of the groove therein inclined inwardly and downwardly at an angle of between 20 minutes to 60 minutes from a line perpendicular to the axis of the piston when the latter is cold, and a piston ring seated in said groove and having its outer peripheral face perpendicular to the center line of said ring and the sides thereof inclined inwardly and toward said center line from said peripheral face so as to include an angle of about 20° therebetween, the distortion of said piston under engine operating temperatures causing said insert to twist to bring said center line of the groove toward alignment with a perpendicular to the axis of said piston so that, when the piston is hot and subjected to gas loading, the lower side of said ring seats flush on the lower side of the groove with the outer face of the ring inclined to the cylinder wall by a small angle, said wall thereby being engaged by said face only along the lower marginal edge thereof.

References Cited in the file of this patent

UNITED STATES PATENTS

| | | |
|---|---|---|
| 1,735,596 | Bowman | Nov. 12, 1929 |
| 2,550,879 | Stevens | May 1, 1951 |
| 2,845,917 | Laubender | Aug. 5, 1958 |
| 3,031,240 | Olsen | Apr. 24, 1962 |

FOREIGN PATENTS

| | | |
|---|---|---|
| 960,098 | France | Oct. 17, 1949 |